Oct. 25, 1927.  W. M. TROUT ET AL  1,646,889
METAL VEHICLE WHEEL
Filed Jan. 20, 1925   2 Sheets-Sheet 2

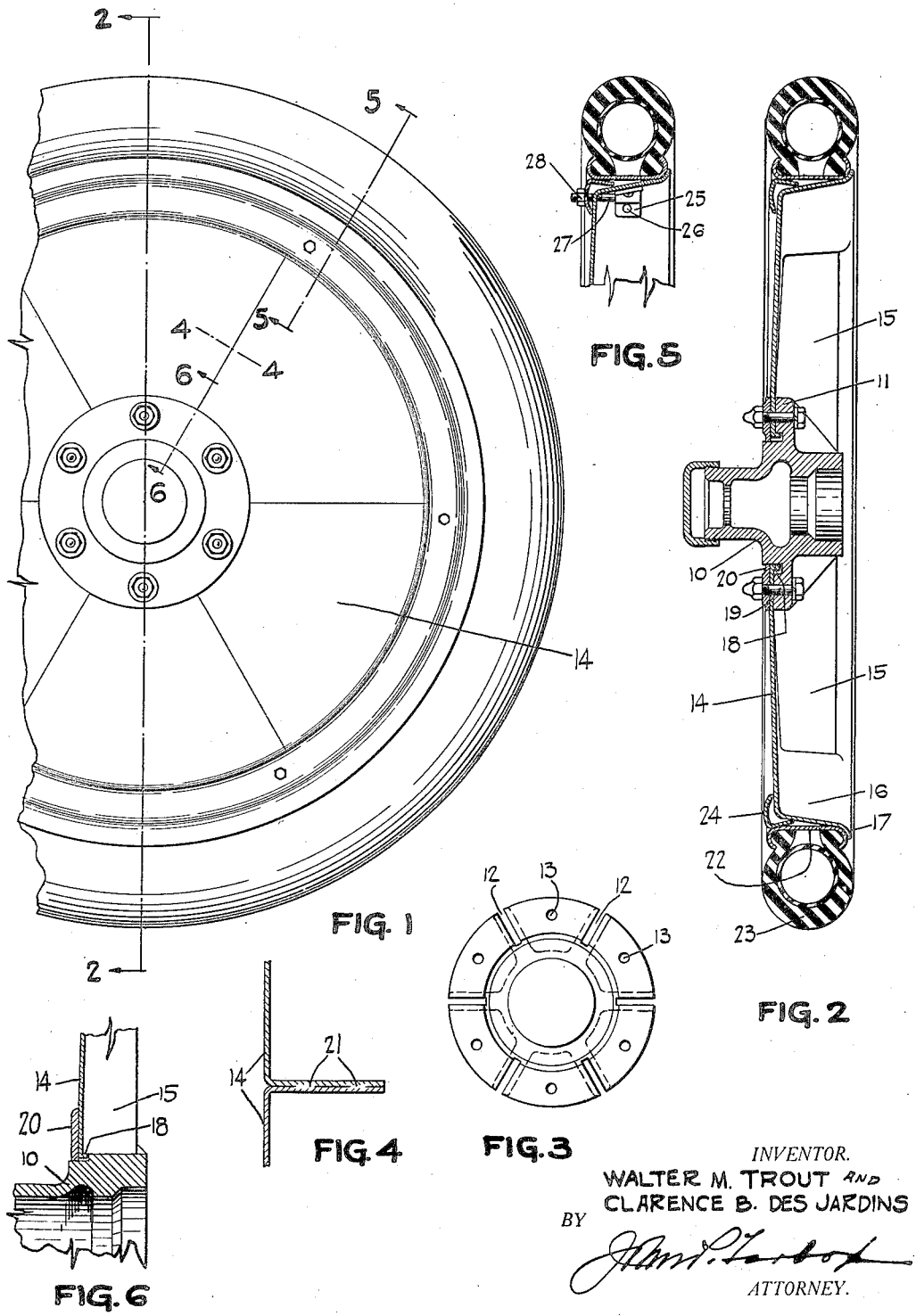

INVENTORS
WALTER M. TROUT AND
CLARENCE B. DES JARDINS
BY
ATTORNEY.

Patented Oct. 25, 1927.

1,646,889

UNITED STATES PATENT OFFICE.

WALTER M. TROUT, OF PHILADELPHIA, PENNSYLVANIA, AND CLARENCE B. DES JARDINS, OF WASHINGTON, DISTRICT OF COLUMBIA, ASSIGNORS TO BUDD WHEEL COMPANY, OF PHILADELPHIA, PENNSYLVANIA, A CORPORATION OF PENNSYLVANIA.

METAL VEHICLE WHEEL.

Application filed January 20, 1925. Serial No. 3,663.

This invention relates to improvements in metal vehicle wheels and has to do, more particularly, with metal wheels of the disc type adapted for use on automobiles.

One of the objects of our invention is to provide an improved metal wheel suitable for use on automobile, composed of a plurality of sheet metal stampings which are simple and cheap to make and which are assembled to form a wheel disc.

Another object of our invention is to provide a metal vehicle wheel having a wheel disc built up of a plurality of segmental, sheet metal stampings assembled together and provided with inclined, outwardly-flaring flanges, forming a frustra-conical support for a demountable rim.

Another object of our invention is to provide a disc wheel made up of a plurality of sheet metal stampings assembled and rigidly united and provided with means for detachably carrying a demountable rim.

Another object of our invention is to provide a sheet metal wheel for automobiles which is simple in construction and may be produced at a low cost and which is, at the same time, very strong, durable and light.

Further objects, and objects relating to economies and details of operation and construction, will definitely appear from the detailed description to follow. Our invention is clearly defined and pointed out in the appended claims. A metal wheel embodying our invention is illustrated in the accompanying drawing, forming a part of this specification, in which Fig. 1 is a view of the wheel in elevation.

Fig. 2 is a vertical, sectional view, taken on the line 2—2 of Fig. 1.

Fig. 3 is a plan view of the hub.

Fig. 4 is a detail, sectional view, taken on the line 4—4 of Fig. 1.

Fig. 5 is a detail, sectional view through the rim, taken on line 5—5 of Fig. 1.

Fig. 6 is a detail, sectional view through the wheel at the hub, taken on the line 6—6 of Fig. 1.

In the drawings, the same reference numerals refer to the same parts throughout the several views and the sectional views are taken looking in the direction of the arrows at the ends of the section lines.

Figure 7:
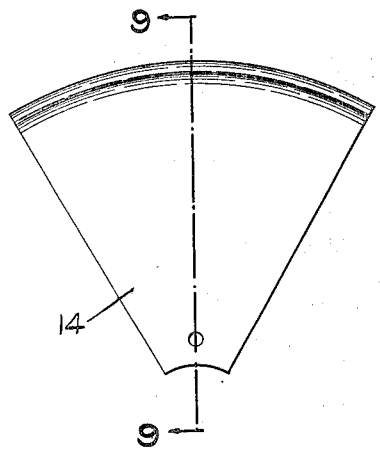
Fig. 7 is a plan view of one of the segmental, sheet metal stampings out of which the wheel disc is built up.
Figure 8:
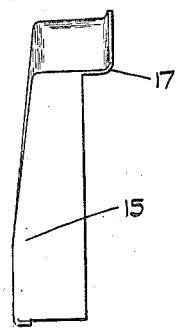
Fig. 8 is an end view of this stamping.
Figure 9:
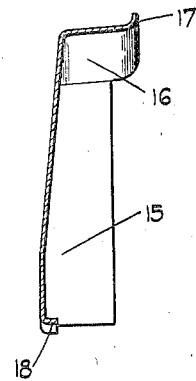
Fig. 9 is a sectional view through the stamping, on the line 9—9 of Fig. 7.
Figure 10:
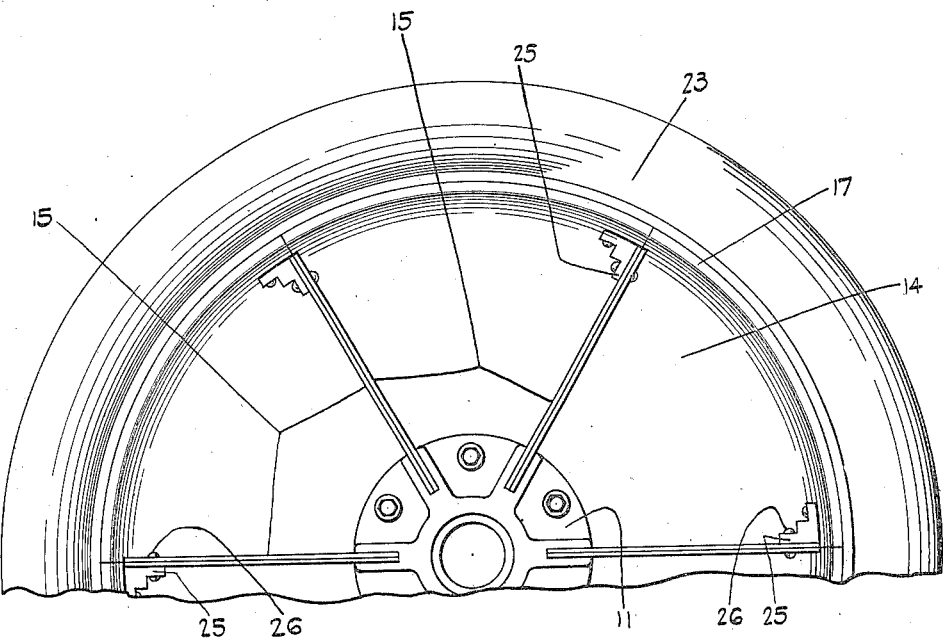
Fig. 10 is a fragmentary view, in elevation, looking at the inside of the wheel.

In general, our invention consists in a wheel including a hub and a wheel disc rigidly secured to the hub and carrying a demountable rim. The wheel disc is made up of a plurality of segmental, sheet metal stampings, which are assembled and united, edge to edge, to form the wheel disc. The outer edges of these sections have inclined or outwardly-flared, curved flanges, which, when the sections are in assembled position, form an inclined, frustra-conical support for the demountable rim. The several sections may also be provided with laterally-extending flanges at the sides and, when the sections are assembled, these flanges on adjacent sections are in contact with each other and are rigidly united so as to hold the several sections in assembled position. The hub may be provided with a flange to which the wheel disc is secured by a series of bolts passing through the several sections which make up the wheel disc. Preferably, the hub and the hub flange are provided with radial grooves extending longitudinally of the hub, in which the inner ends of the lateral flanges on the disc sections are seated. The inclined rim support at the periphery of the disc may terminate in a shoulder, which forms a stop shoulder for one side of the demountable rim, and the latter may be retained in place by a lock ring bolted to the disc.

The wheel illustrated in the drawing, and which comprises one embodiment of our invention, includes a hub, 10, having a radially extending flange, 11, provided with a plurality of radial slots or grooves, 12. Holes, 13, are provided in the flange, 11, between the grooves, 12, in order to accommodate the bolts for fastening the wheel disc to the hub. The wheel disc is made up of a plurality of, in this case, six, segmental, sheet metal stampings, 14. As stated, these stampings are segmental in form so that, when assembled edge to edge, they form a circular disc. The flanges, 15, project laterally from the side edges of each stamping, 14, and, when the sections are assembled together, these flanges, 15, extend radially of the disc. At the outer edge of each section, 14, there is the laterally-projecting and inclined or outwardly-flared, curved flange, 16, which terminates in the upwardly-projecting, stop shoulder, 17. When the sections are assembled in proper relation, the curved flanges, 16, on the several sections are in line with each other and form a substantially continuous, frustra-conical surface at the periphery of the disc, serving as a support for the rim. The inner edge of each section is provided with a short, inturned flange, 18, as shown in Fig. 2. These several sections, 14, are assembled with their flanges, 15, in contact with each other throughout their length, and rigidly united, for instance, by means of the spot welds, 21. These welds serve to hold the sections of the disc in assembled relation with respect to each other.

The wheel disc, formed of the sections, 14, is mounted on the hub with the inner ends of the flanges, 15, seated in the grooves, 12, of the hub and the rear faces of the sections, 14, engaging the front face of the hub flange, 11. The disc is rigidly secured to the hub by means of the bolts, 19, projecting through the holes, 13, in the hub flange, through holes in the several sections, 14, near the inner edges thereof, and through a slip flange, 20, applied to the front face of the disc around the hub.

A demountable rim, 22, carrying a tire, 23, is mounted upon the inclined or frustra-conical rim support formed by the several flanges, 16, at the periphery of the disc. If desired, these several flanges may be welded together at the joints between them so as to present a substantially continuous surface and strengthen the wheel. The inner edge of the demountable rim, 22, engages the stop shoulders, 17, of the flanges, 16, and the demountable rim may be held in place by the angular locking ring, 24, having a portion which engages the front of the disc and a portion which engages the outer side of the demountable rim and supports it against the stop shoulders, 17. This locking ring, 24, is detachably bolted to the disc. In this embodiment, I provide angle brackets, 25, which have one leg riveted, at 26, to one of the flanges, 15, of each section, near the upper end thereof, and the other leg riveted to the curved flange, 16. Each of these brackets has a threaded stud, 27, which projects through the body portion of the disc section, 14, and through the locking ring, 24, the latter being held in place by nuts, 28, screwed on these studs, 27.

It has been found that a slight dishing of the disc makes the appearance of the disc wheel more attractive and I provide for the formation of a dished disc out of these several sections, 14, by making the body portions of these sections inclines, so that, when the several sections are assembled and united, their outer faces form a slightly conical surface. The various spot welds, 21, are merely to hold the sections assembled. Consequently, the strength of the wheel does not depend upon the effectiveness of these welds. The torsional stresses due to driving and braking are transmitted through the metal of each section, directly from the bolts, 19, to the rim of the wheel, and the metal is, of course, amply sufficient to resist the tendency to elongation due to these torsional strains. The flanges, 15 and 16, on the several sections give each section the characteristics of a column and a radial load is taken by these sections, acting as columns, just as in spoke wheels of the compression type. Since the inner ends of the flanges, 15, seat on the hub in the grooves, 12, these flanges act as buttresses to resist any tendency to deflection of the sections due to side thrust acting against the side of the wheel.

It will be observed that the several parts of the wheel are of very simple construction so that they can be manufactured at a very low cost. This is particularly true of the wheel disc since it is made up of sheet metal stampings which are relatively small and simple to make and which do not require any large and expensive dies for their manufacture. The provision of the lateral flanges on the several sections greatly strengthens the wheel and makes it possible to use relatively light weight metal in these sections, thus decreasing the cost and the weight of the wheel. We have shown a wheel made of six sections, assembled to form the complete wheel disc, but it will be understood that we are not to be restricted to this particular number of sections.

We are aware that the wheel disclosed in this application may be varied considerably without departing from the spirit of our invention and, therefore, we claim our invention broadly, as indicated by the appended claims.

Having thus described our invention, what we claim as new and desire to secure by Letters Patent is:

1. A wheel comprising a hub, a wheel disc provided with a number of radial ribs, a rim support, a rim, a wheel ring adapted to secure the rim on the support, and ring-securing means anchored to said ribs.

2. A wheel comprising a main body provided at its periphery with a rim support, a rim, a locking ring for the rim, locking means for the ring, which locking means bear on the rim support and the body of the wheel in different planes and are anchored to the rim support and the body of the wheel in the respective planes of bearing.

In testimony whereof we hereunto affix our signatures.

WALTER M. TROUT.
CLARENCE B. DES JARDINS.